Oct. 31, 1933.  E. C. RANEY  1,932,988
THERMIC SWITCH
Filed April 2, 1930   2 Sheets-Sheet 1
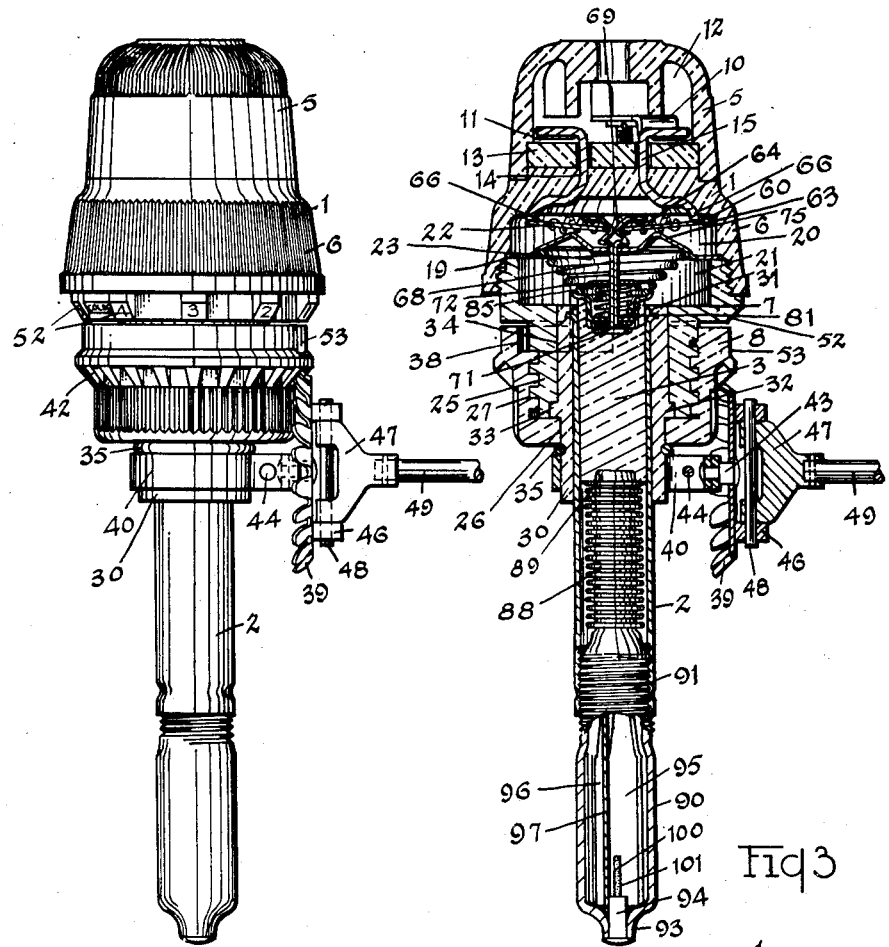
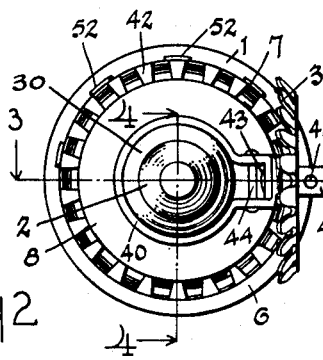
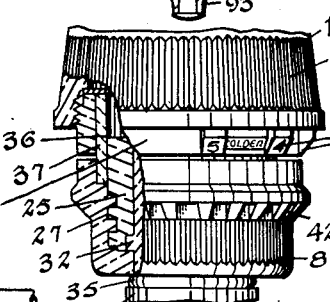
Inventor
Estel C. Raney

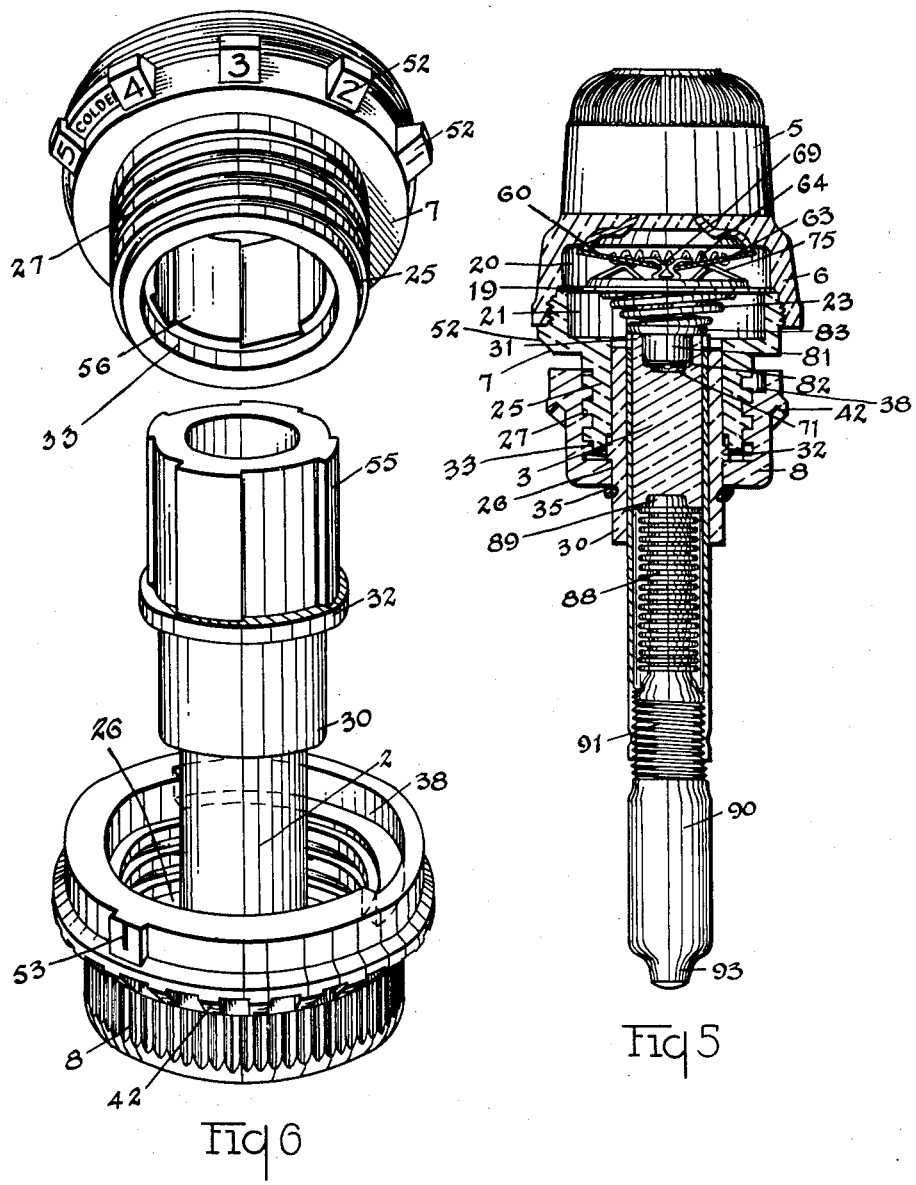

Patented Oct. 31, 1933

1,932,988

UNITED STATES PATENT OFFICE 1,932,988

THERMIC SWITCH

Estel C. Raney, Columbus, Ohio

Application April 2, 1930. Serial No. 441,064

10 Claims. (Cl. 200—140)

My invention relates to thermic devices that are operated by the changes in volume of a thermic fluid material. It has for its object to provide a means for varying the temperature point at which the thermic device will be operated. The invention is particularly advantageous in its use when applied to the thermic and electric control of refrigerators wherein frigidity is maintained by a cylic performance of parts of the refrigerating apparatus and the control is brought about by instituting the sequential operations as the temperature of a part of the refrigerator changes within narrow limits. More particularly the invention has for its object to provide a means whereby an electric switch may be repeatedly operated at any particular temperature selected within a wide range, and which may be used for the control of any device or apparatus.

In the preferred form of structure, the sequential operations of the switch are determined by the changes in volume due to the change of the physical condition of a liquid in a mixture of liquids. The liquids selected are of such a character that the liquid, freezable within the temperatures within which the apparatus is to be controlled, causes separation by solidification of the freezable liquid and thus varies the proportion of the liquids in the mixture and, likewise, the melting or liquefying of the freezable liquid during the rising of the temperature of the mixture will cause a remixing of the liquid, liberated by the melting of the solidified or frozen liquid material, with the non-freezable liquid, to restore the proportions of the mixture. Thus, as one of the liquids of the mixture solidifies, its proportion or percentage in the mixture decreases and, as the solidified liquid melts, its proportion or percentage in the mixture is increased. Also, the liquids are such that the freezing temperature of the freezable liquid of the mixture decreases as the percentage of the freezable liquid decreases. The freezing point of the freezable liquid being lowered, as its percentage decreases, there is produced an exceedingly wide range of temperature within which any desired particular temperature may be selected for the purpose of maintaining the frigidity of any part of the apparatus substantially constant.

Any mixture or solution of materials may be used where there is the ready separation and corresponding temperature variation upon solidification of one of the materials and ready restoration upon the melting of the solidified material, and where the materials do not vary in character by their continued use in the manner described.

In the preferred form of construction, alcohol and water is used, since the alcohol and water readily combine to form a solution and the alcohol does not have any tendency to crystallize or deteriorate or modify during a long period of use. Alcohol maintains a constant variation of the freezing temperature of the water as the alcoholic content of the mixture varies, and with a given alcoholic content in the mixture, the normal freezing temperature of the water is always the same, notwithstanding repeated changes of temperature that may occur. As the temperature of the solution reduces, water crystallizes, in forming ice, thereby decreasing the percentage of the water and consequently lowering the freezing point of the remainder of the water within the mixture as the crystallization of the water progresses. The converse occurs as the temperature rises to cause melting of the ice, which progressively raises the melting point of the remainder of the ice.

Thus, by my invention, I have provided a means whereby adjustment in temperature control may be readily made and whereby the sequential operations of the apparatus controlled by the switch will be brought about with certainty and accuracy at the particular temperature that may be selected and for which adjustment is made.

It has been found that in practice initial solidification of materials in solutions will, under certain conditions, occur at temperatures several degrees below its natural or normal freezing or solidifying point. A solution or a mixture of liquids may thus require several degrees of supercooling to initiate crystallization of one of the elements of the solution. The temperature will rise and solidification will continue at the normal freezing or solidifying temperature. Consequently, if there is present some of the material in solid form, further solidification will occur when the solution descends to the normal solidifying temperature, the solid material in the solution operating to institute further solidification or operating as a basis for further crystallization.

Initial crystallization may thus occur at temperatures that vary within the same mixture under conditions that cannot be foreseen, and except for my invention, would prevent certainty of the responsiveness of the apparatus to bring about and maintain a substantially constant desired temperature in the apparatus that it is desired to control. As for example, except for my invention, a solution of water and alcohol may be reduced in temperature to 14° F. where the mixture is such that normal freezing of the water in the mixture should occur at 30° F.

For the operation of the thermic device, I confine the liquids in an expansible container and use an initial crystallizing means whereby solidification of the freezable liquid is produced at the normal temperature as determined by the mixture used. I have found that by the use of an insoluble material, whose particles will act as a nuclei for the deposition of the initial solidifying portions of the freezable liquid, that supercooling will be greatly reduced.

The supercooling that occurs will vary according to the character of the material used as the nuclei. Thus, where the material used is a finely divided material insoluble in the liquids, such as emery, supercooling is materially reduced. Also, preferably, the crystal initiating particles are located in contact with heat conductive surfaces containing the liquid. Once solidified particles of the material is produced, solidification progressively builds up at the normal temperature of solidification of the material as dependent or modified by the concentration of the material in the solution. Thus, where water and alcohol is used, the crystal initiating particles in contact with heat conductive parts of the device will bring about initial crystallization at a greatly reduced supercooling, such as, a cooling of three or four degrees below the normal.

In the preferred form of structure, supercooling is substantially eliminated by the use of a crystalline material insoluble in the liquids and having a crystalline formation of the same order or substantially the same character as that of the solidifiable material of the solution, such as, where water and alcohol is used, a crystalline material, hexagonal in form, such as beryl, is preferably used. The beryl crystals are preferably distributed over and located in contact with and within a heat conductive part of the expansible container of the liquid and so as to readily remove the heat from the beryl crystals, and bring about initial crystallization of the water to insure the immediate response to the temperature conditions of the apparatus to be controlled.

The initiating crystals used may be varied. It has been found that mineral crystals, which are isometric or isomorphic with ice crystals and insoluble in the solution, are the more desirable and will in each case greatly reduce supercooling to bring about initial crystallization.

The invention may be contained in structures that vary in their details and used for a variety of purposes. To illustrate a practical application of the invention, I have selected a structure containing the invention and shall describe it hereinafter. The structure selected, as an example, is shown in the accompanying drawings.

Fig. 1 illustrates a side view of the thermic switch. Fig. 2 is a top view of the thermic switch. Fig. 3 is a view of a section taken on the plane of the line 3—3 indicated in Fig. 2. Fig. 4 is a view of a section of a part of the switch taken on the plane of the line 4—4 indicated in Fig. 2. Fig. 5 is a view similar to that shown in Fig. 3, the parts being shown in position different from that shown in Fig. 3. Fig. 6 is a composite view showing parts in perspective.

The instrument illustrated in the drawings is provided with a head 1, that may be formed largely of insulating material. The head 1 contains a switch that is operated by a thermic element. A stem 2 is connected to the head for containing the thermic element and a suitable block 3 is located within the stem to transmit the expansive movements of the thermic element to the movable contact of the switch.

The head 1 is formed of four parts, 5, 6, 7, and 8. The part 5 forms a female plug for removably connecting the thermic device 2 with an electric circuit. Suitable elastic bowed or bent contacts 10 and 11 are located within a chamber 12 formed within the part 5 by means of a partitioning wall 13. The blades 14 and 15 are insertible through the wall 13 and are bent angularly to engage the contacts 10 and 11 and so as to depress the contacts 10 and 11.

The parts 6 and 7 are threaded, one into the other, to interconnect them. A sheet metal wall or disc 19 is located intermediate edged portions of the parts 6 and 7 and form, with the parts 6 and 7, the chambers 20 and 21. The movable and fixed contacts of the switch 22 are located in the chamber 20 and a switch actuating spring 23, operable upon the contraction of the thermic element to move the movable contact, is located in the chamber 21.

The part 8 is threaded onto a neck 25 formed on the part 7. It is made in the form of a cup, the bottom of the cup shaped part 8 being provided with an opening 26 through which the stem 2 extends, and to which it is rotatably connected. The stem 2 extends through the neck 25 of the part 7 and rotation of the part 8, by reason of the thread 27, operates to move the stem 2, together with the thermic element located therein, towards, or away from, the movable contact of the switch to adjust the temperature at which the switch will be operated by the thermic element, by varying the volume, or elongation, of the thermic element that will cause the switch to open and close.

The part of the stem located within the head is, preferably, provided with a sleeve 30 that may be formed of a moldable material and in which the stem 2, that is formed of sheet metal, is suitably anchored as by the outwardly turned ears or lugs 31, that is embedded within the moldable plastic of which the sleeve 30 is formed. Preferably, the stem 2 extends through the sleeve 30 and is anchored near the upper end of the sleeve. The sleeve 30 is also provided with a ridge 32 and the lower end of the neck 25 is provided with a flanged end portion 33 within which is located the ridge 32. The neck 25 is provided with an opening 34 having a diameter substantially the same as the outer diameter of the sleeve 30. One side of the ridge 32, and the opening 26 in the bottom of the cup shaped member 8, has a diameter substantially the same as the outer diameter of the sleeve 30 on the other side of the ridge 32. Consequently, the stem 2 and the sleeve 30 may be inserted through the cup and the cup may then be threaded onto the neck 25 of the part 7. The sleeve 30 is provided with a groove, located from the ridge 32 a distance equal to the thickness of the bottom of the member 8, and a ring 35 is sprung into the groove, which rotatably connects the member 8 to the sleeve 30. To locate the sleeve 30 in the desired position relative to the movable contact of the switch and, consequently, to locate the thermic element in the desired temperature controlled position with reference to the switch, the member 8 is rotated and the thread operates to longitudinally move the sleeve 30.

The thread 27 of the neck 25 and the part 8 is, preferably, square and has relatively considerable pitch whereby a slight rotative movement of the part on the sleeve 30 will cause a considerable change in the relative location of the sleeve and the thermic element relative to the switch.

In order to provide limitation of the rotative movements of the part 8 and, consequently, to provide suitable limits of the temperature range within which a selected temperature may be located, one or more suitable stops are provided for limiting the displacement or movements of the sleeve 30 and, consequently, of the thermic element relative to the switch. To provide for ready assembly of the parts 7 and 8, the interior of the cup shaped portion is provided with recesses 35 that extend substantially semicircularly around the axis of the cup shaped part 8 and a block 36 is located in the part 8, it being insertible through an opening 37 formed in the part 7 and between the side wall of the part 7 and the neck 25. It is held in the opening 37 by the wall or disc 19 which is clamped between the parts 6 and 7. The block 36 protrudes into the recess 38 and, consequently, rotation of the part 8 is limited to angular movements within the length of the recess 38 as determined by the block 36. This limits the longitudinal movements of the sleeve 30 to the proportionate distance between the adjoining turns of the thread of the neck 25 and the cup shaped part 8.

If desired, the cup shaped member 8 may be operated at a point remote from the thermic device by means of a toothed member, such as the crown gear wheel 39, which is rotatably supported by means of the suitable stirrup 40. The cup shaped member 8 is provided with a plurality of ridges 42 extending in radially located planes and forming teeth that may be engaged by the teeth of the crown gear wheel 39. The crown gear wheel 39 is supported to rotate about an axis at right angles to the axis of the cup shaped member 8 by means of the pivot pin 43 that extends through the crown gear wheel 39 and is riveted over the crown gear wheel to form an engaging head. The pivot pin 43 extends through the ends of the strip that forms the stirrup 40. The end portions of the stirrup 40 protrude from the sleeve 30 and a bolt or rivet 44 operates to clamp the stirrup 40 to the lower end of the sleeve 30. The part 8 being rotatably connected to the sleeve 30, by means of the ridge 32 and the ring 35, the crown gear wheel will be maintained in mesh with the ridges 42 of the part 8. The crown gear wheel 39 may be provided with a pair of lugs 46 and the block or yoke 47 may be located intermediate the lugs 46 and connected thereto by means of the pin 48. A rod 49, of a suitable length, may be connected to the yoke 47 and rotated by any suitable handle conveniently disposed for operating the crown gear wheel 39 at a point more or less remote from the thermic device. Thus the thermic device may be located at any desired point that may be convenient for ready manual adjustment and the rod 49 may extend to a position where the adjustment may be easily made as, for example, to the exterior of the refrigerator.

A suitable indexing means, such as the protruding lugs 52, may be located upon the member 7 which is a stationary part of the device and a suitable lug 53, having a part noticeably marked, may be located on the rotatable cup shaped member 8. The relative location of the cup shaped member 8 will thus be indicated by the relation of the marked lugs located on the parts 7 and 8 which will indicate the relation of the thermic element with reference to the switch and, consequently, indicate the thermic condition at which the apparatus, controlled by the switch, is being operated.

In order to maintain the sleeve 30 in its slidable relation with respect to the member 7, and to prevent rotation of the sleeve by the rotation of the part 8, the exterior of the sleeve 30 and the interior of the neck 25 may be provided with suitable ridges or splines, such as the splines 55 and 56, that interfit and prevent rotation of the sleeve 30 relative to the part 7 and insure a corresponding longitudinal movement of the sleeve 30 and, consequently, of the thermic element relative to the movable contact of the switch.

The movable contact 60 of the switch 22 is formed of a pair of plates 63 that are connected together for pivotal movements, one relative to the other. Preferably, the contiguous ends of the plates 63 are located in recesses of a part of the switch actuating member and springs 64 are connected to the outer ends of the plates 63 near the corners of the plates. The springs 64 operate to produce a thrust or pressure components in the planes of the plates 63 and towards each other and the lateral components that tend to angularly move the plates relative to each other. The plates 14 and 15 that extend through the wall of the part 6 of the head, also form the fixed contacts 66 of the switch. The edges of the plates 14 and 15, located within the part 6, form the contacting areas of the switch. The contacting pressure between the outer ends of the plates 63 and the fixed contacts 66 approximate that of the lateral components of the pressure at the inner ends of the plates. When the lateral components are reversed, the plates 63 are moved away from the fixed contacts 66.

The movable contact 60 of the switch 22 is connected to the thermic element located in the stem 2 by means of a pair of sheet metal strips 68 and the block 3. The strips 68 have portions bent to form V-shaped channels 69 having a length substantially the same as the width of the plates 63. The strips 68 are so placed that the V-shaped channel openings of the strips extend in opposite directions. They are secured in this position when assembled by means of the discs 71 and 72 through which portions of the strips extend. The ends of the strips may be riveted to the disc 71. The movable contact 60 of the switch is supported for movements relative to the plate 19 that is secured in the head 1 between the parts 6 and 7. The plate 19 is die-pressed to shape and there is formed in the plate 19, V-shaped ridges 75. The plate 19 is provided with a slot that is located between, and extends parallel to, the ridges 75, through which the strips 68 extend. The plate 19 is located in the plane substantially parallel to the plane of the edges of the fixed contacts 66. This locates the plane of the tops of the ridges 75 parallel to the plane of the contacts and, preferably, the parts are so formed that these planes are in close proximity to each other. The ridges are placed close to the axis of the instrument or about midway between the axis of the instrument and the fixed contacts. The tops of the ridges 75 are therefore located intermediate the points of connection of the ends of the springs 64 with the plates 63. In the operations of the movable contact 60, by the springs 64, the protruding ridges 75 of the plate 19 coact to produce a wide opening of the contacts and an early closing of the switch in the movement of the thermic element that operates the switch through the connecting member formed by the strips 63 and the block 3. When the inner ends of the plates pass through the plane of the fixed contacts, the outer ends of the plates will be moved away from the fixed contacts and so as to strike the ridges 75 of the plate 19. The points of connection of the ends of the springs 64, being located on the outside of the ridges, the springs 10 draw the outer ends of the plates towards each other as the plates pivot on the tops of the ridges 75. In the reverse movement of the actuating member, the plates will tilt on the ridges 75 moving the outer ends of the plates towards the fixed contacts upon a relatively short contractile movement of the thermic element and until the inner ends of the plates 63 pass through the plane of the ridges 75. The lateral components produced by the springs 64, at the ends of the plates, will then be reversed and the ends of the plates will be brought into contact with the fixed contacts.

The switch 22 is operated by the expansion and contraction of the thermic element. The thermic element operates on the movable contact member to break the circuit through the contacts, and the compression spring 23 operates on the movable contact as the thermic element contracts, to complete the circuit through the contacts. A rod or block 3, located in the end portion of the stem, which is located within the head 1, is reciprocally moved within the stem 2 by the thermic element located in the exposed portion of the stem and the spring 23 that is located intermediate the plate 19 and the inner end of the rod or block 3. A thimble 81 is located in the recess 82 formed in the end of the rod 3. The strips 68 extend through the bottom of the thimble 81 and the disc 71 is located on the outside of the thimble 81. The thimble has a flange 83 that rides on the end edge of the block 3 formed between the recess 82 and the outer surface of the block 3. Preferably, the flange is skirted to provide a recess for receiving the smaller end of the convolute spring 23. The plate 19 has a recessed central portion to form a seat for the larger end of the convolute spring 23. The convolute spring enables relative free movements of the turns of the spring one within the other.

The bottom of the thimble 81 is located in spaced relation with respect to the bottom of the recess 82, to permit movements of the disc 71 and the lower ends of the strips 68. A compression spring 85 is located within the thimble 81 and intermediate the disc 72 and the bottom of the thimble. The lower ends of the strips 68 extend through a slot formed in the bottom of the thimble and are movable between the limits provided by the bottom of the thimble and the bottom of the recess 82. When, therefore, the block 3 is moved by the expansion of the thermic element, it compresses the spring 85 against the vertical component produced at the inner ends of the plate 16 by the tension of the springs 64, and also movement of the block 3 operates to compress the spring 23. The spring 85 is compressed until the lower ends of the strips 68 engage the bottom of the recess 82. Continued upward movement of the block 3 moves the strips 68 and the inner ends of the contact plates 63 until the lateral component, induced by the springs 64, is less than the pressure produced by the spring 85. The lateral components at the inner ends of the plates is substantially the same as the lateral components of the outer ends of the plates against the fixed contacts and the lateral components is sufficiently great for a good contact pressure between the contacts of the switch up until they are equal to the maximum pressure that the inner ends of the plates are subjected by the movement of the block 3 operating through the spring 85.

When, therefore, the contact pressure between the contacts of the switches diminishes to a certain point, which, however, is sufficiently great to maintain a good contact pressure, the spring 85 will cause the inner ends of the plates to snap through the plane of the contact surfaces of the fixed contacts and the lateral components produced by the springs 64 will be reversed which will operate to raise the disc 71 and the lower ends of the strips 68 from the bottom of the recess 82. Upon the reversal of the lateral components, the switch will be opened. The central portions of the plates 63 will strike the ridges 75 and tilt over the ridges to produce wide opening of the switch.

When the thermic element contracts, the block 3 is moved by the spring 83 and the inner ends of the plates 63 will immediately move in the same direction by reason of the interengagement of the disc 71 on the bottom of the thimble 81. The contact plates tilt on the ridges 75 and quickly raise the outer ends of the plates above the planes of the tops of the ridges 75 and again reverse the lateral components produced by the springs 64 to cause a quick electric connection by a very short movement of the inner ends of the contact plates.

The spring 85 operates to maintain the block 3 in contact with the thermic element located in the stem. The thermic element comprises the sheet metal bellows 88 that is secured to the wall of the stem at a point intermediate the ends of the stem. Preferably, the block 3 is provided with a recess 89 for receiving a closed end of the bellows which operates to maintain the end of the bellows in axial alignment in the instrument.

If desired, the other end of the bellows 88 may be connected to a shell 90. The interior of the bellows communicates with the interior of the shell and the two are filled with a suitable thermic material that has, preferably, a large coefficient of expansion. Preferably, fluids, such as mixtures of liquids, are used, one of which melts or solidifies at substantially different temperatures as determined by the proportions of the mixture. In the particular form of construction shown in the drawings, the bellows 88 and the lower end portion of the stem are filled with a mixture of water and alcohol in desired proportions, which may be used to vary the range of temperatures within which a temperature may be selected for maintaining a part of the apparatus controlled by the switch. The bellows, being located within the stem and separated therefrom by air space, is thereby shielded to a certain extent from the transmission of heat while the lower end of the stem is in the more direct heat conductive relation with reference to exterior bodies and, consequently, heat is more readily transmitted to and from that portion of the liquid mixture located in the outer end portion of the stem than to and from the portion of the liquid located in the bellows.

The shell 90, which forms the outer end of the stem, provides a means for adjusting the bellows 88 with reference to a switch during the assembly of the thermic device. The bellows 88, being connected to the upper end of the shell 90, the shell 90 may be adjusted by means of the threaded portion 91 of the shell to locate the bellows 88 in its desired position with reference to the contacts of the switch, whereupon the shell 90 may be soldered or otherwise secured in its adjusted position.
The thermic material is introduced into the bellows and the stem through the contracted end 93 that is closed by means of a plug 94 and the plug may be soldered.

The end of the stem is, preferably, tapered to form between the plug 94 and the surfaces of the tapered end, a space for the thermic material that conforms to a cylindrical member having a sharp circular knife edge. The part that conforms to the knife edge is located intermediate the flaring inner surface of the tapered wall of the end 93 and the surface of the plug 94. The thermic material that thus surrounds the plug, and located within the tapered wall, is surrounded by, and contains within itself, a relatively large amount of metal which has high heat conductivity and, since the metal between these highly conductive parts is thinned down to a sharp edge or line, the temperature of the thermic material at this point will be substantially the same as that of the outside atmosphere contiguous to the outer end of the stem that will readily set up crystallization in such space and bring about early solidification of the freezable material in the body of the stem.
The stem is also provided with a heat distributor 95 for conducting and transmitting the heat from the wall of the stem and throughout the thermic material located within the stem. It has portions 96 in contact with the surface of the wall of the stem and portions 97 located in proximity to the axis of the stem whereby heat will be readily transmitted through the member to and from the wall of the stem into that portion of the material located in the outer end of the stem and remote from the bellows to distribute the heat throughout the thermic material in that portion of the stem. This provides a means that insures the solidification of the thermic material within the stem at a point remote from the bellows in advance of solidification of the material within the bellows. The bellows is also shielded by the air space located intermediate the bellows and the wall of the shell. The expansion occurring by the solidification of the material in the outer end of the stem is transmitted through the non-solidified material in the stem and bellows which cause the bellows to expand and eventually operate the switch.

In order to produce initial crystallization of the freezable liquid in the mixture of liquids located in the bellows and the lower end of the tube, an insoluble finely divided, preferably crystalline material, is located in the solution or mixture of liquids in order to provide nuclei for the gathering or formation of the initial crystals. The finely divided crystal initiating material is located in contact with a heat conductive surface whereby there will be ready transmission of the heat from the finely divided particles.
In the form of construction shown in the drawings, the plug 94 is provided with a stem 100 that projects into the lower end of the stem 2. The insoluble finely divided particles are, preferably, spread over parts of the surface of the stem 100 and may be secured thereto in any suitable manner, such as by means of a lacquer or by forcing the particles against the surface as by rolling, with pressure, the stem in the particles and thus forcing portions of each of the particles into the metal of which the stem is formed. Preferably, a finely divided crystalline material having a crystalline formation, of the form that is produced in the solidified liquid, such as beryl 101, when water is used as the freezable liquid in alcohol. Both the beryl and the ice are crystalline and both form, in congealing, crystals of the hexagonal order. Where used in connection with alcohol and water in the container and in contact with the heat transferring body, the beryl will produce prompt crystallization of the water when it reaches substantially the temperature at which ice crystals will form from ice crystals, that is, when it reaches the normal freezing temperature of water subject to the modification produced by the presence of alcohol.
The beryl will consequently eliminate supercooling to induce the initial crystallization of the water as occurs where there are no nuclei about which initial crystals may form or gather.

I claim:
1. In a thermic switch, a member ofr supporting the switch, an expansible container containing a thermically expansible fluid for actuating the movable contact of the switch and slidably supporting the member, a rotatable part for moving the member relative to the container to vary the temperature points at which the expansion of the container will actuate the movable contact of the switch.

2. In a thermic switch, a member for supporting the switch, an expansible container containing a thermically expansible fluid for actuating the movable contact of the switch and slidably supporting the member, a rotatable element for moving the member relative to the container to vary the temperature points at which the expansion of the container will actuate the movable contact of the switch, and means located on the rotatable element for relatively indicating the temperature variation produced by the rotation of the rotatable member.

3. In a thermic switch, a shell for containing the switch, an expansible container containing a thermically expansible fluid for actuating the movable contact of the switch and slidably supporting the shell, a rotatable member for moving the shell relative to the container to vary the temperature points at which the expansion of the container will actuate the movable contact of the switch.
4. In a thermic switch, an expansible container containing a thermically expansible material for actuating the movable contact of the switch, a member for supporting the switch and slidably connected with the container to prevent rotation of the member relative to the container, a rotatable element for slidably shifting the member relative to the container to vary the temperature points at which the movable contact of the switch will be actuated by the container.
5. In a thermic control device, an expansible container for containing a thermic fluid, a movable member actuated by the expansion of the container, a shell for containing the member and slidably supported on the container, a rotatable member having means for slidably moving the shell relative to the container to vary the temperature points at which the container will actuate the movable member, and an indicating means supported on the shell and the rotatable member for indicating relatively the temperature variation produced by the rotation of the rotatable member.

6. In a thermic switch, an expansible container for actuating the movable contact of the switch and containing a thermic fluid, a member for supporting the switch, means for slidably supporting the member on the container, a threaded bushing rotatably supported on the container and connected to the member for shifting the member relative to the container, the said slidable means preventing rotation of the shell relative to the container.

7. In a thermic switch, an expansible container for actuating the movable contact of the switch and containing a thermic fluid, a shell for containing the switch, a means for slidably supporting the shell on the container to prevent rotative movements of the shell relative to the container, a member rotatably supported on the container and operating to shift the shell relative to the container upon rotation of the rotatable member for varying the temperature points at which the container actuates the movable contact of the switch.

8. In a thermic switch, a container for containing a thermic fluid and having a bellows part and a shell part, a sleeve connected to the shell part and containing the bellows part, a member for supporting the switch, means interconnecting the bellows part with the movable contact for operating the movable contact by variation in volume of the bellows part, and means for shifting the member and the switch relative to the sleeve and the container to vary the temperature points at which the movable contact of the switch is actuated by the expansion of the bellows part.

9. In a thermic switch, a container for a thermic fluid having a bellows part and a shell part, a sleeve connected to the shell part and containing the bellows part, a member for supporting the switch, means interconnecting the bellows part with the movable contact of the switch for actuating the movable contact of the switch by the variation in the volume of the bellows, the member having a collar surrounding the said sleeve and means for slidably supporting the member on the sleeve and for preventing rotation of the member, a rotatable means interconnecting the sleeve and the collar for shifting the member relative to the container to vary the temperature points at which the movable contact of the switch is actuated by the expansion of the bellows.

10. In a thermic switch, a container for a thermic fluid having a bellows part and a shell part, a sleeve connected to the shell part and containing the bellows part, a member for supporting the switch, means interconnecting the bellows part with the movable contact of the switch for actuating the movable contact of the switch by the change in volume of the bellows, the member having a collar surrounding the said sleeve, means for slidably supporting the member on the sleeve and for preventing rotation of the member, a rotatable bushing interconnecting the sleeve and the collar for shifting the member relative to the container to vary the temperature points at which the movable contact of the switch is actuated by the expansion of the bellows, the bushing and the member having indicating means for relatively indicating the temperature variations at which the bellows will actuate the movable contact of the switch as produced by the rotation of the bushing.

ESTEL C. RANEY.